(12) United States Patent
Zahirovic et al.

(10) Patent No.: US 10,150,092 B2
(45) Date of Patent: Dec. 11, 2018

(54) FLOAT VALVE FOR A CHEMICAL REACTOR

(71) Applicant: Haldor Topsøe A/S, Kgs. Lyngby (DK)

(72) Inventors: Emir Zahirovic, Copenhagen (DK); Klaus Risbjerg Jarlkov, Harlev (DK); Flemming Plougstrup Nielsen, Roskilde (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/554,350

(22) PCT Filed: Feb. 18, 2016

(86) PCT No.: PCT/EP2016/053439
§ 371 (c)(1),
(2) Date: Aug. 29, 2017

(87) PCT Pub. No.: WO2016/139069
PCT Pub. Date: Sep. 9, 2016

(65) Prior Publication Data
US 2018/0036700 A1 Feb. 8, 2018

(30) Foreign Application Priority Data
Mar. 5, 2015 (EP) .................................. 15157801

(51) Int. Cl.
*B01J 8/02* (2006.01)
*F16K 31/30* (2006.01)

(52) U.S. Cl.
CPC ............ *B01J 8/025* (2013.01); *B01J 8/0278* (2013.01); *F16K 31/30* (2013.01); *B01J 2208/0061* (2013.01); *B01J 2208/00548* (2013.01); *B01J 2208/00938* (2013.01); *B01J 2219/00247* (2013.01)

(58) Field of Classification Search
CPC ........ B01J 8/025; B01J 8/0278; B01J 8/0453; B01J 8/0492; B01J 2208/0061; B01J 2208/00938; F16K 31/30
See application file for complete search history.

(56) References Cited

U.S. PATENT DOCUMENTS

| | | | |
|---|---|---|---|
| 2,940,467 A * | 6/1960 | Smith | F16K 31/30 137/432 |
| 5,009,079 A | 4/1991 | Zinsmeyer | |
| 5,417,078 A | 5/1995 | Hueniger et al. | |
| 5,989,414 A | 11/1999 | Bzorgi | |
| 2009/0158763 A1 | 6/2009 | Liu et al. | |

* cited by examiner

*Primary Examiner* — Lessanework Seifu
(74) *Attorney, Agent, or Firm* — Blank Rome LLP

(57) ABSTRACT

A float valve for a chemical reactor has a central pipe which glides around a liquid transfer pipe when a liquid level rises and falls, thereby opening for fluid transfer through liquid transfer apertures in the transfer pipe when the liquid level is rising and shutting off for fluid transfer when the float lowers and seals against a sealing ring placed on the transfer pipe below the liquid transfer apertures.

12 Claims, 13 Drawing Sheets

FLOAT VALVE FOR A CHEMICAL REACTOR

FIELD OF THE INVENTION

This invention relates to a float valve to control the flow of liquid and to shut for the passage of both liquid and gas. More particular, the invention relates to a chemical reactor with one or more filtration trays, with float valves installed in the filtration trays to control the liquid level in the tray and to avoid by-pass of gas during operation of the reactor when there is little or no liquid in the trays and thus to avoid pressure drop. The reactor can be a down-flow gas and liquid catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydride-metallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

In certain process technologies, involving two-phase flows, a need exists for preferentially letting out liquid from a confined space.

One typical example can be found in hydroprocessing reactors operating with low boiling point feeds. At regular operating conditions, such reactors treat a gas-phase feed. However, during start-up, when the system is cold the feed is fully or partially in the liquid phase, any confined space where the liquid may accumulate inside such reactors may be subject to the risk of malfunctioning.

This situation can occur on scale catching trays installed inside naphtha hydrotreaters.

Such trays are installed in units experiencing pressure drop problems when particles of different origins as well as products of corrosion, brought to the reactor from upstream equipment, accumulate on the grading or catalyst beds. In order to extend the unit cycle length and to manage pressure drop development over time, in some reactors of those units various types of particle/scale catcher systems are installed. Even though, the gas phase is the only phase in the reactors during normal operations, these particle/scale catching systems must be able to handle liquid too.

The liquid is delivered to the reactor(s) at startup, during the period from feed introduction to the moment when the reactor inlet temperature is higher than the final boiling point of the startup feed. As the period is in the range of a few hours, a lot of the liquid is delivered and any installed tray in the reactor must be designed to enable transfer of the liquid to the next level.

In the art, this problem is commonly solved by installation of liquid transfer tubes. One of the drawbacks of these systems is that, those tubes stay open during all cycle length and the process gas containing particles and scales can bypass the scale catching system.

There is therefore a need for a valve technology that opens when liquid is in the tray, preferentially allowing the flow of liquid downstream, but closes if liquid is absent, so that the gas is treated and the scale catching trays can perform its function on all of the feed in gas-phase, without any by-pass.

U.S. Pat. No. 5,989,414 discloses a self-adjusting extraction nozzle for extracting a surface disposed over a base fluid including a suction tube having at least one slot extending there through. A nozzle channel extends outwardly from the at least one slot. The nozzle channel is slidably coupled to the exterior of the suction tube and to a float to support the nozzle channel at a level of the surface fluid.

U.S. Pat. No. 5,009,079 describes a simple flow control device in a condensate drain pipe to prevent the flow of refrigerant vapour there through and to regulate the flow of liquid refrigerant as a function of the level of accumulated liquid refrigerant in the drain pipe. The only moving part is a float device that rides up on a cylindrical valve body in response to the level of liquid refrigerant to thereby expose slots in the valve body which allow for the flow of liquid refrigerant to the refrigerant return line to the cooler.

US2009158763 discloses a refrigerant floating expansion apparatus including a main body, a standpipe, a float element and a separation element. The main body includes a base plate and a pipe-shaped housing. The standpipe fixed on the base plate has a second pipe opening and a third pipe opening. The pipe wall of the standpipe has at least an opening near the second pipe opening. The float element surrounds the standpipe for controlling a fluid-passing area of the opening. The separation element surrounding the float element is disposed on the base plate and forms an inner path with the pipe-shaped housing. The separation element has several fluid passageways near the base plate. A high-pressure fluid entering the main body is guided to pass through the fluid passageways to move the float element for controlling the fluid-passing area of the opening. Then, the high-pressure fluid is transferred to a low-pressure fluid.

In spite of the above mentioned known art, a need exists for a robust valve which can operate in harsh environments with elevated temperature and pressure and in surroundings with impurities.

SUMMARY OF THE INVENTION

The present invention is a float valve which due to its robust design is particularly well suited for operation in chemical reactors where high pressures and temperatures are present. Its design also ensures reliable operation even in environments with impurities in the liquid and gas.

The float valve comprises a liquid transfer pipe which can transfer liquid from one position in the reactor to another, but will shut off for transfer of gas. The height of the liquid level which actuates the valve to allow for transfer through the liquid transfer pipe can be selected by varying the position, the height in which liquid transfer apertures are located in the transfer pipe. These liquid transfer apertures allows liquid to enter the transfer pipe from one position or level, run through the transfer pipe and exit at another level or position, e.g. from one tray in a reactor to another tray.

Conventionally reactors have been equipped with such transfer pipes which allows liquid to flow from one position to another once a certain liquid level has been reached. But these traditional transfer pipes have the drawback that they also let process gas transfer from one position to another, whether or not liquid is present. This is a problem since it lets at least some of the process gas by-pass the process steps in the reactor and inflicts the pressure drops over the internals of the reactor.

According to the present invention, this problem is solved by a float which can block the apertures when there is no liquid present around the valve or when the liquid level is below a certain limit. In this way, no process gas may pass through the transfer pipe during normal operation when only process gas is present; hence there is no by-pass of the process gas and no pressure drop inflictions. The float comprises a central pipe which glides freely around the transfer pipe, a top plate and one or more side plates. The top plate may be doughnut shaped and the float may be cylindrical in shape. In such an embodiment, the inner edge of the doughnut shaped plate is connected to the central pipe and the outer edge of the doughnut shaped plate is connected to the cylindrically shaped side plate. It is however particular for the present invention that the float has no closed bottom plate. There may be enforcements or a plate with large holes, but it is characteristic for the float that its bottom is open such that no fluid is entrapped inside the float. In this way, the float can operate even though it is produced in normal atmospheric pressure and has to operate in high pressures and also no gas is entrapped in the float which may present a risk if it during operation gets in contact with the process gas of the reactor. Hence, in an embodiment of the invention, the float may be bell shaped, with closed top and sides, but an open bottom. The volume and weight of the float is designed so that any process liquid rising in the reactor is able to lift the float due to its buoyancy.

The central pipe of the float is designed to shut off the transfer apertures. In an embodiment of the invention, this is done by means of a sealing ring which is connected around the transfer pipe below the transfer apertures. When the float is in its lower position (when liquid is not lifting the float), the lower edge of the central pipe seals against the sealing ring, and thus blocks the transfer apertures of the transfer pipe.

To guard the float valve against impurities which may otherwise block or hinder the function of the valve, a guard head may in one embodiment protect the upper part of the float valve. The guard head may also be bell shaped with a circular top plate, a cylindrical side plate and an open bottom. But other shapes such as cubic, rectangular, multi-sided or the liked may also be used for both the float and the guard head. In a further embodiment of the float valve, vent apertures may be placed in the top part of the guard head to ensure free operation and gliding of the float.

The float valve can be us for types of reactors used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydride-metallisation—HDM), oxygen conversion (hydrodeoxygenation—HDO) and hydrocracking (HC). Alternatively, the float valve may be used in a reactor such as a radial converter, where elements of the decks have to be fixed to the reactor. This type of reactor has a radial flow crossing a packed bed of catalytic material and it is typically used in the petroleum and chemical processing industries for carrying out catalytic reactions such catalytic reforming and ammonia synthesis.

FEATURES OF THE INVENTION

1. A float valve for a chemical reactor comprising
   a liquid transfer pipe comprising at least one liquid transfer aperture
   a sealing ring arranged on the transfer pipe below the at least one liquid transfer aperture
   a float comprising a central pipe adapted to fit around said liquid transfer pipe in a free gliding engagement,
   wherein the float has a volume to weight ratio large enough to enable it to float on a liquid and adapted to be in a sealing engagement with the sealing ring when the float is in a lower position relative to the liquid transfer pipe, the float is an enclosed volume on its upper end and its sides and has an opening at its lower end.
2. A float valve according to feature 1 wherein the float is cylinder shaped with a doughnut shaped upper plate a cylindrical side plate and wherein the outer periphery of the doughnut plate is connected to the upper edge of the cylindrical side plate and the inner periphery of the doughnut plate is connected to the upper end of the central pipe and wherein the float has no bottom plate.
3. A float valve according to any of the preceding features, wherein the sealing engagement is between the lower edge of the central pipe and the sealing ring.
4. A float valve according to any of the preceding features, wherein the at least one liquid transfer aperture is formed as one or more slots.
5. A float valve according to any of the preceding features, further comprising a guard head on top of the liquid transfer pipe with an open lower end and an inner diameter larger than the outer diameter of the float, for protecting the float valve against scales and impurities.
6. A float valve according to feature 5, wherein the guard head comprises vent apertures at its upper part.
7. A chemical reactor comprising at least one tray comprising at least one float valve, wherein said float valve comprises
   a liquid transfer pipe comprising at least one liquid transfer aperture
   a sealing ring arranged on the transfer pipe below the at least one liquid transfer aperture
   a float comprising a central pipe adapted to fit around said liquid transfer pipe in a free gliding engagement,
   wherein the float has a volume to weight ratio large enough to enable it to float on a liquid and adapted to be in a sealing engagement with the sealing ring when the float is in a lower position relative to the liquid transfer pipe, the float is an enclosed volume on its upper end and its sides and has an opening at its lower end.
8. A chemical reactor comprising at least one tray comprising at least one float valve according to feature 7, wherein the float is cylinder shaped with a doughnut shaped upper plate a cylindrical side plate and wherein the outer periphery of the doughnut plate is connected to the upper edge of the cylindrical side plate and the inner periphery of the doughnut plate is connected to the upper end of the central pipe and wherein the float has no bottom plate.
9. A chemical reactor comprising at least one tray comprising at least one float valve according to any of the features 7, 8, wherein the sealing engagement is between the lower edge of the central pipe and the sealing ring.
10. A chemical reactor comprising at least one tray comprising at least one float valve according to any of the features 7-9, wherein the at least one liquid transfer aperture is formed as one or more slots.
11. A chemical reactor comprising at least one tray comprising at least one float valve according to any of the features 7-10, further comprising a guard head on top of the liquid transfer pipe with an open lower end and an inner diameter larger than the outer diameter of the float, for protecting the float valve against scales and impurities.

12. A chemical reactor comprising at least one tray comprising at least one float valve according to feature 11, wherein the guard head comprises vent apertures at its upper part.
13. A chemical reactor comprising at least one tray comprising at least one float valve according to any of the features 7-12, wherein said chemical reactor is a radial converter for carrying out catalytic reactions, catalytic reforming or ammonia synthesis, said radial converter has a radial flow crossing a packed bed of catalytic material and comprising deck elements, wherein said deck elements are fixed to the reactor.
14. A chemical reactor comprising at least one tray comprising at least one float valve according to any of the features 7-12, wherein said chemical reactor is a reactor is adapted to carry out the catalytic reactions, sulphur and nitrogen conversion (HDS/HDN); hydrogenation of: olefins (HYD) and aromatics (hydrodearomatisation—HDA), metals removal (hydride-metallisation—HDM), oxygen conversion (hydrodeoxygenation—HDO) or hydrocracking (HC).
15. Use of a float valve according to any of the features 1-6 for a chemical reactor.

DESCRIPTION OF THE DRAWINGS

The invention is further illustrated by the accompanying drawings showing examples of embodiments of the invention.

POSITION NUMBERS

01. Float valve.
02. Liquid transfer pipe.
03. Liquid transfer aperture.
04. Sealing ring.
05. Float.
06. Central pipe.
07. Doughnut shaped upper plate.
08. Cylindrical side plate.
09. Guard head.
10. Vent apertures.
11. Liquid level.
12. Tray bottom plate.

Figure 1:
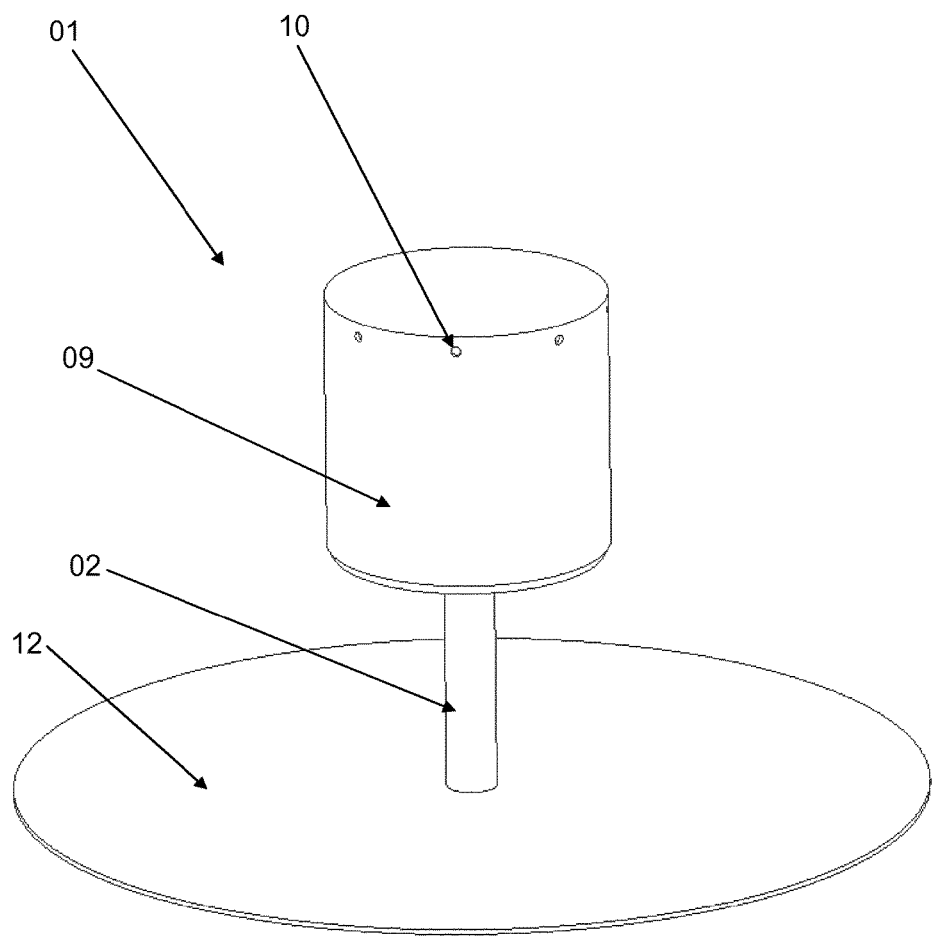
FIG. 1 shows a schematic drawing of the float valve assembly on the bottom plate of a tray.

In FIG. 1 the float valve 01 is seen in isometric view. It's liquid transfer pipe 02 is placed on the bottom plate of a tray 12. The internals of the valve are not visible since they are covered by the guard head 09 which protects them against e.g. impurities and scales. To prevent the float to be fixed in the guard head by under pressure, the guard head is provided with vent apertures 10.

Figure 2:
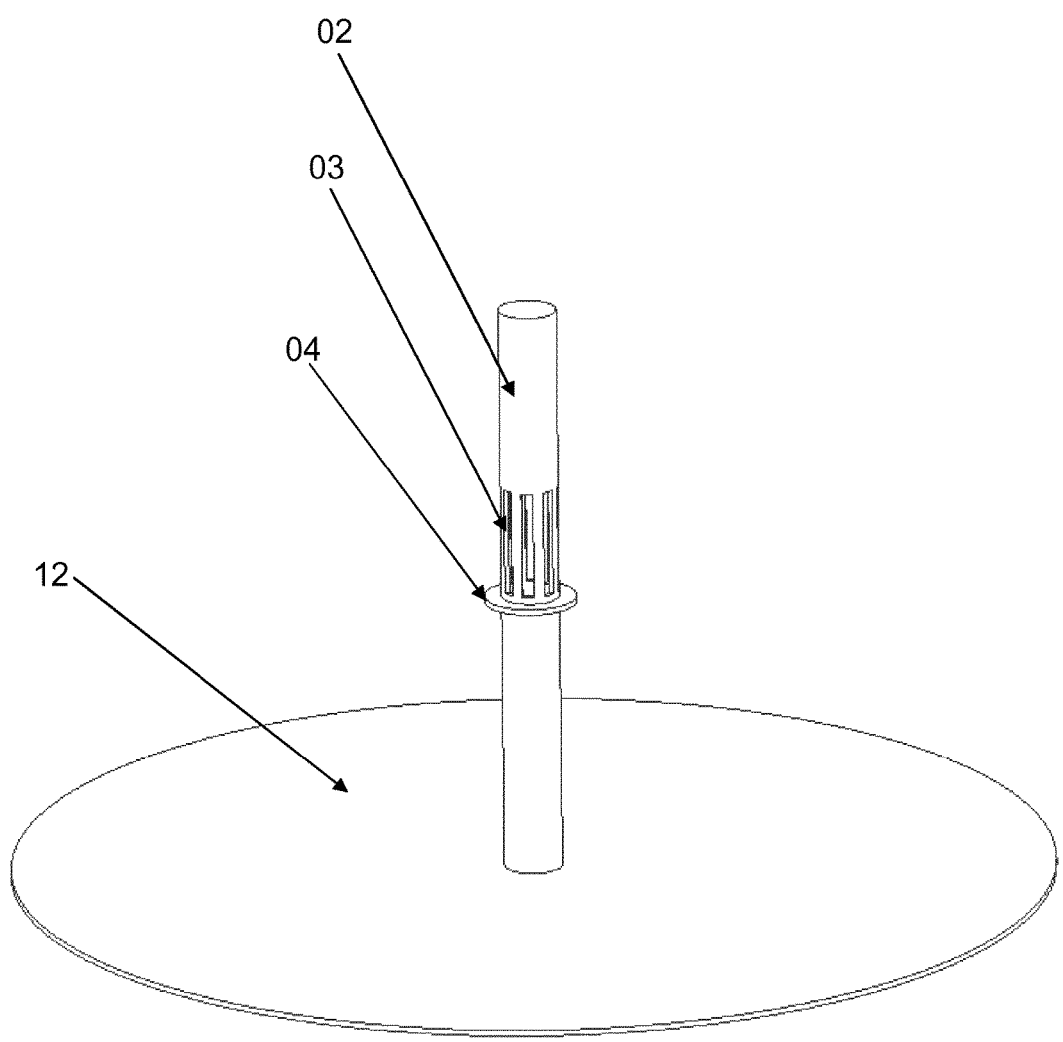
FIG. 2 shows the liquid transfer pipe on the bottom plate of a tray.
Figure 3:
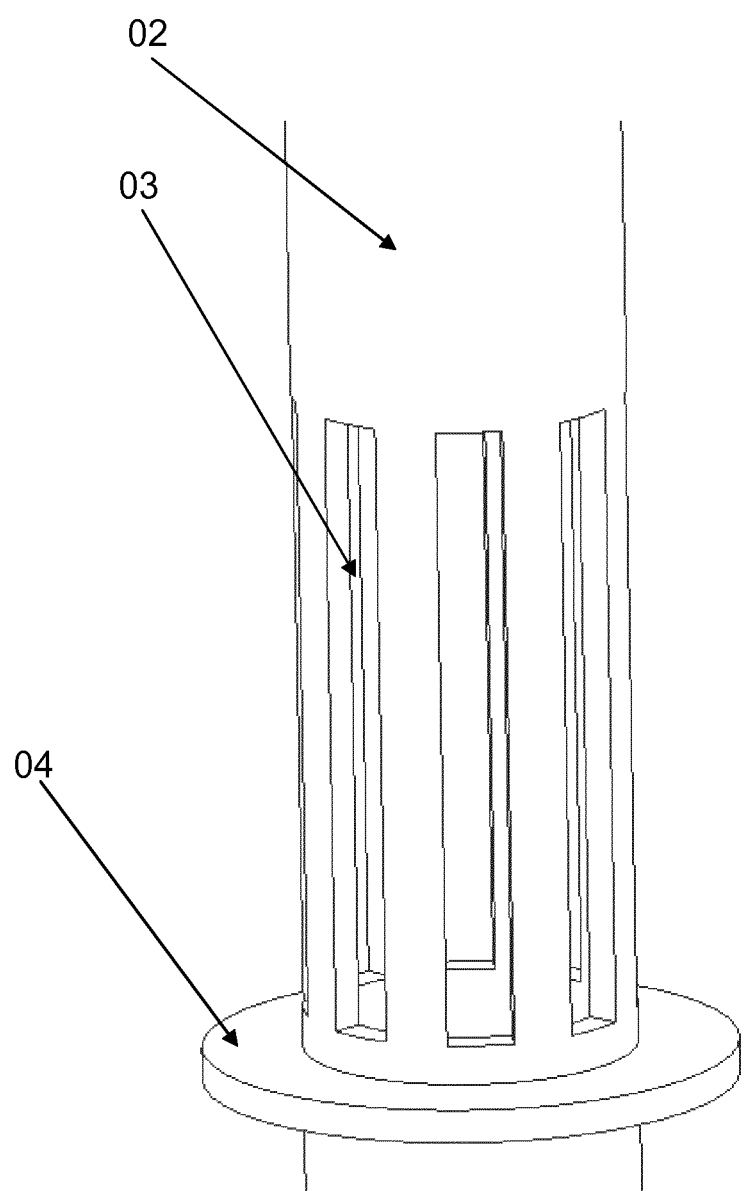
FIG. 3 shows an enlargement of the liquid transfer apertures and the sealing ring.

FIG. 2 shows some of the internals of the float valve, without the float and the guard head. The liquid transfer pipe is shown in its total length, making the liquid transfer apertures 03, here formed as slots, visible. It can be seen that the liquid level in a tray can be varied by varying the distance from the lower part of the slots to the tray bottom plate. Also visible is the sealing ring 04 located below the apertures. This can be seen in a more detailed view in FIG. 3.

Figure 4:
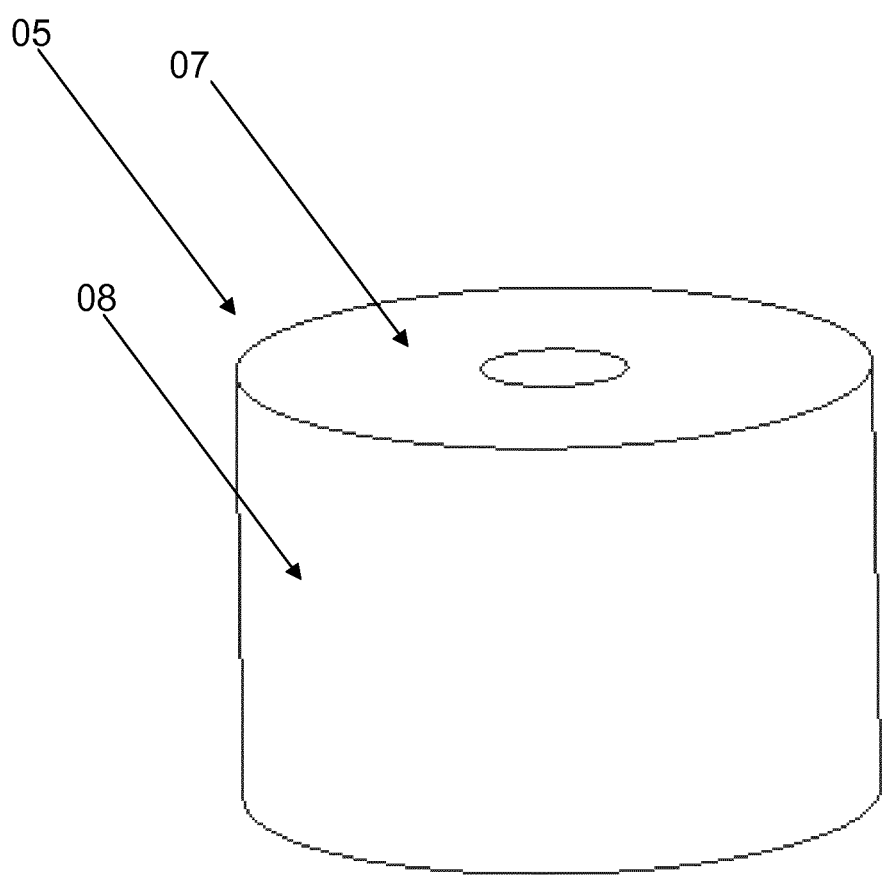
FIG. 4 shows the float.
Figure 5:
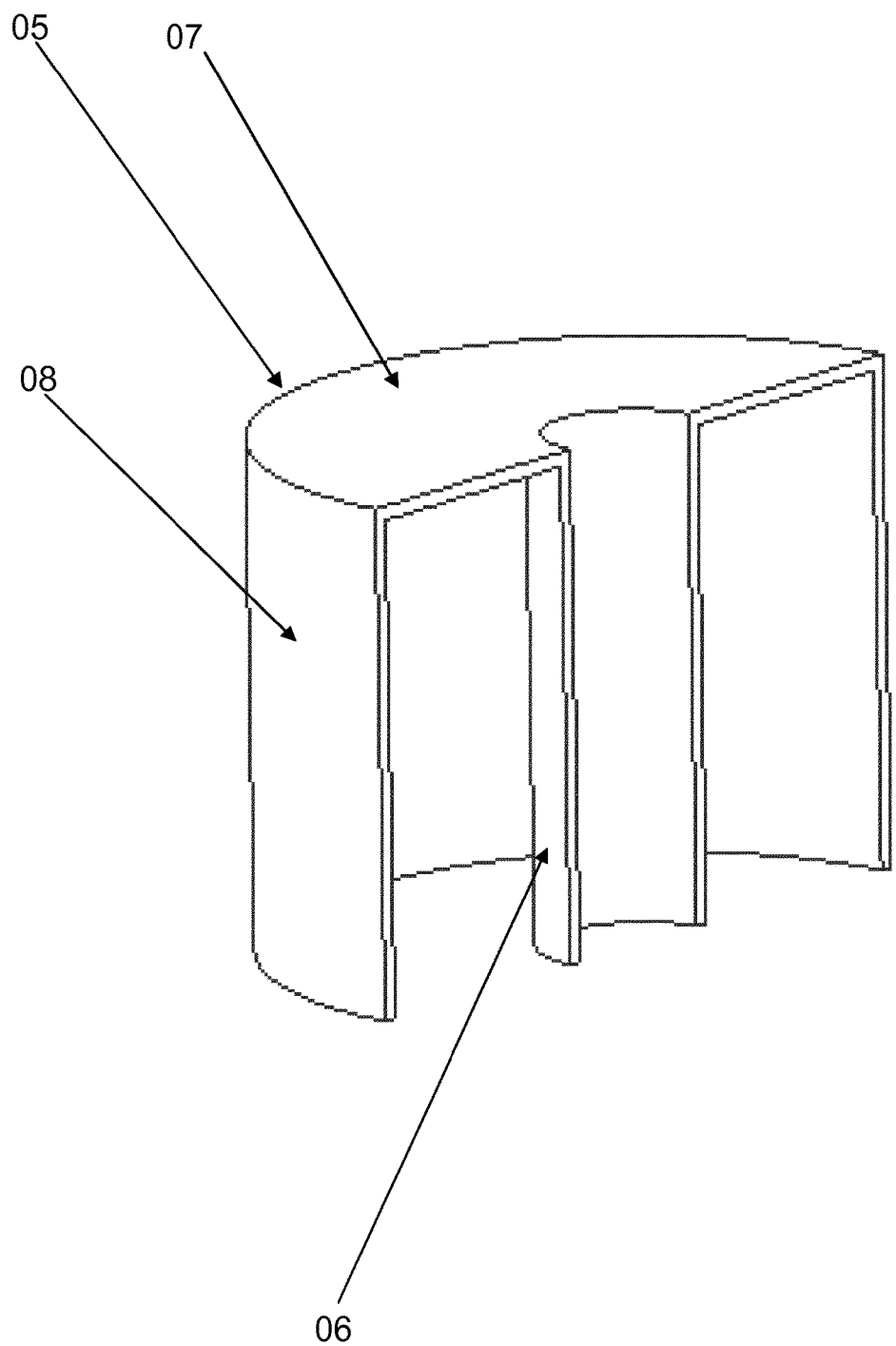
FIG. 5 shows a cut through view of the float.
Figure 6:
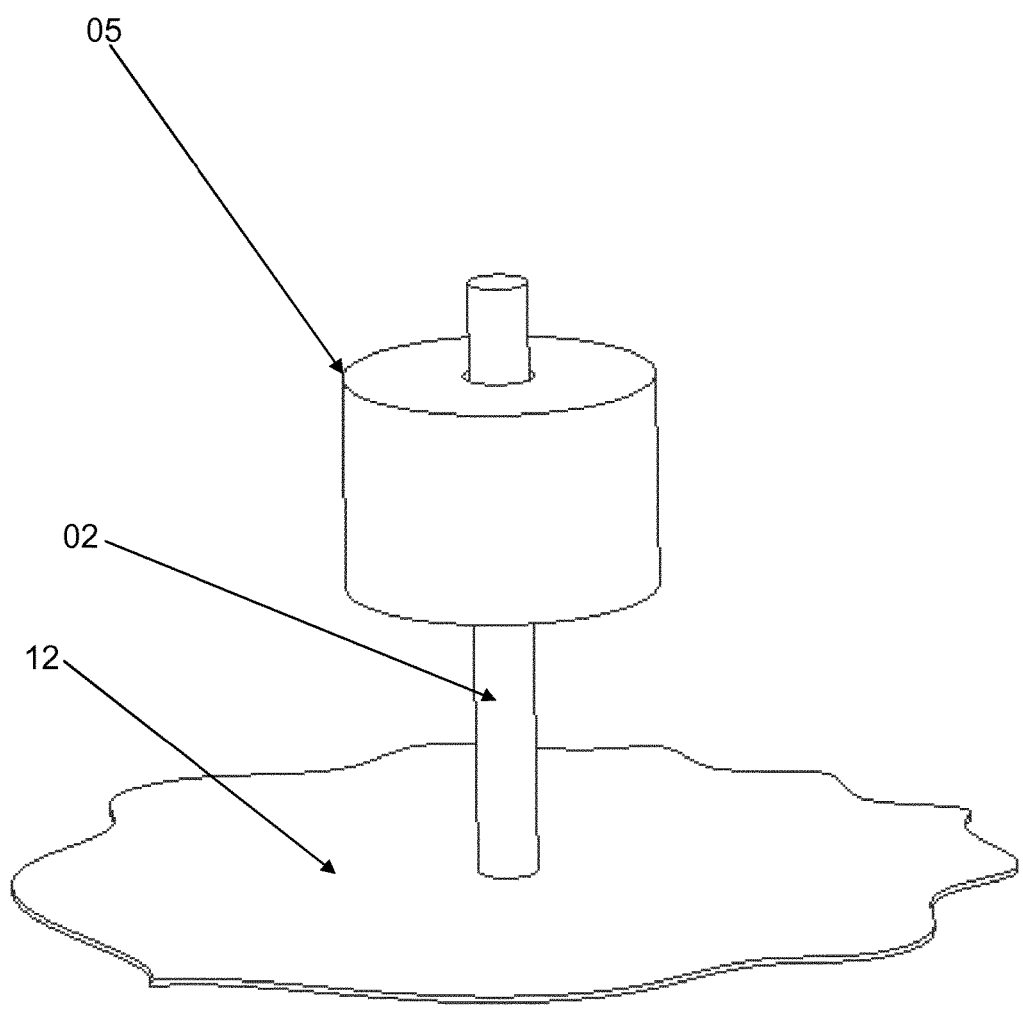
FIG. 6 shows a schematic drawing of the float valve assembly on the bottom plate of a tray.

In FIGS. 4 and 5, the float 05 is shown in detail and in cut view. It is in principle a cylindrically shaped doughnut fully opened on the bottom side, with a doughnut shaped upper plate 07 and a cylindrically shaped side plate 08. The central pipe 06, has a slightly larger inner diameter than the outer diameter of the liquid transfer pipe to ensure that the float can slide freely up and down around the transfer pipe, but a smaller diameter than the outer diameter of the sealing ring to ensure the ability of sealing engagement of the central pipe and the sealing ring. The float is positioned on the transfer pipe as shown on FIG. 6.

Figure 7:
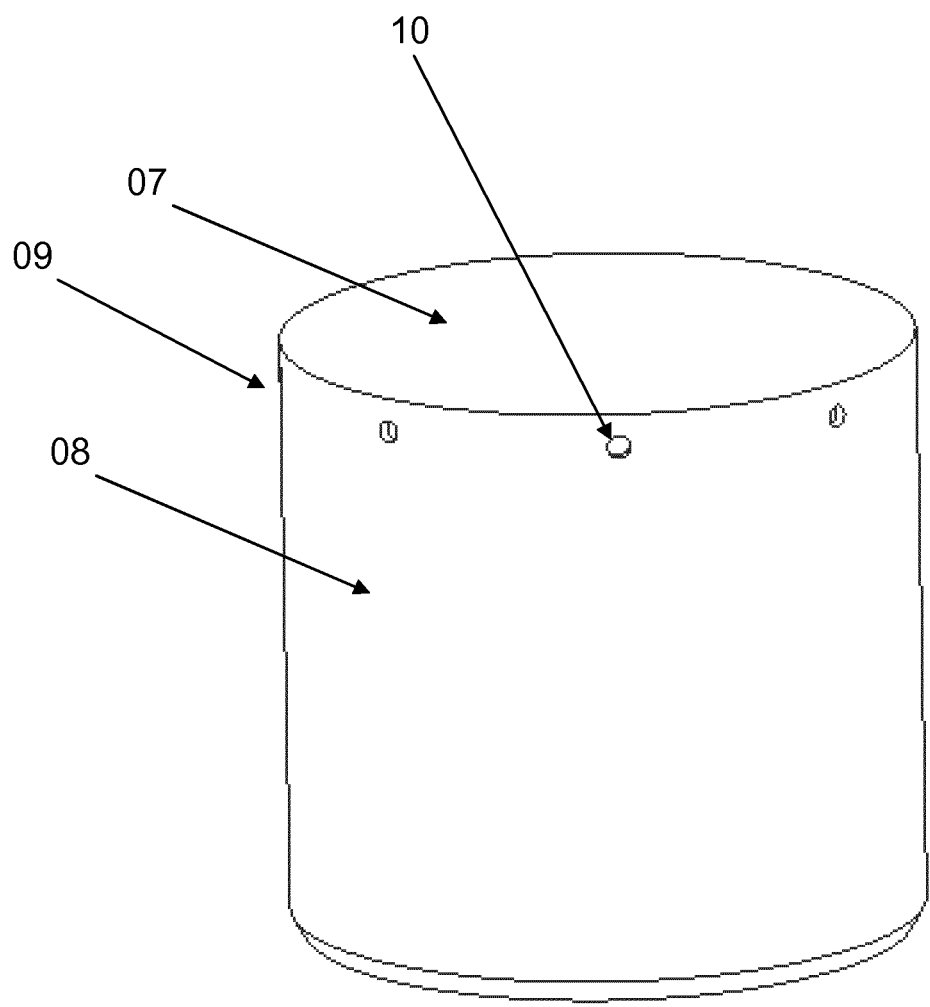
FIG. 7 shows an isometric view of the guard head.
Figure 8:
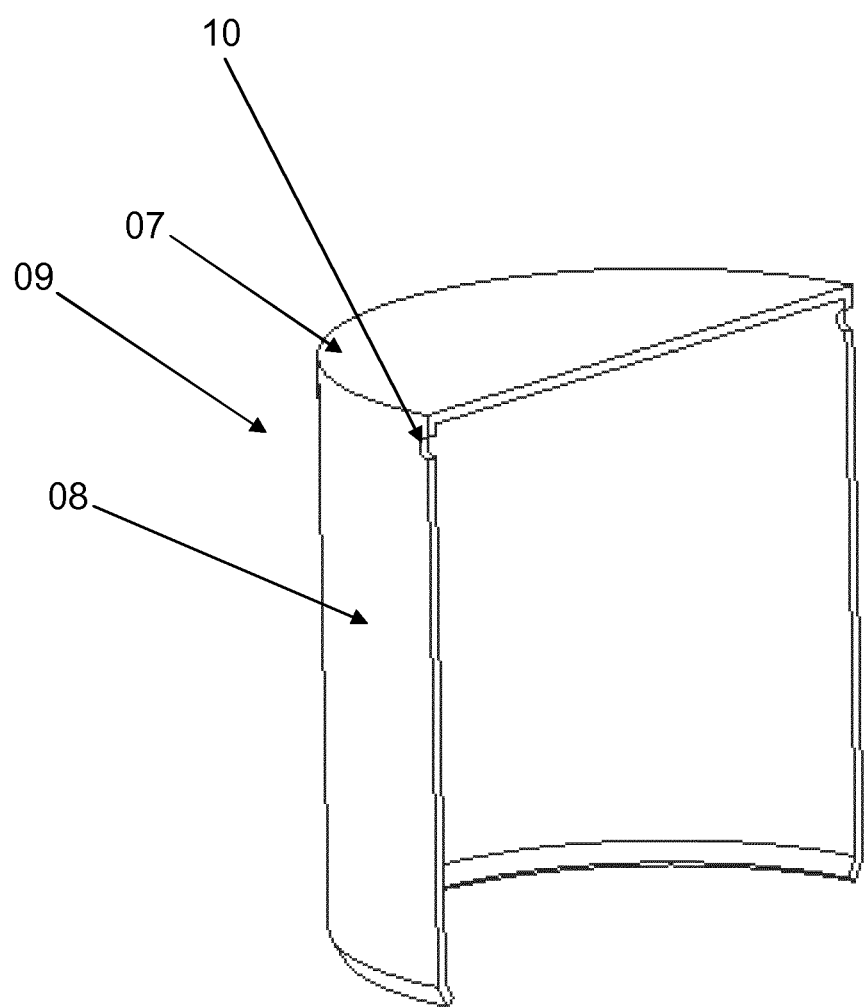
FIG. 8 shows a cut through view of the guard head.

The guard head is shown in detail in FIG. 7 and in cut view in FIG. 8. Like the float, also the guard head is in this embodiment cylinder shaped with no bottom side. It is positioned on top of the liquid transfer pipe to cover and guard the float valve and prevent particles and scales from reaching the space between the float and the transfer pipe.

Figure 9:
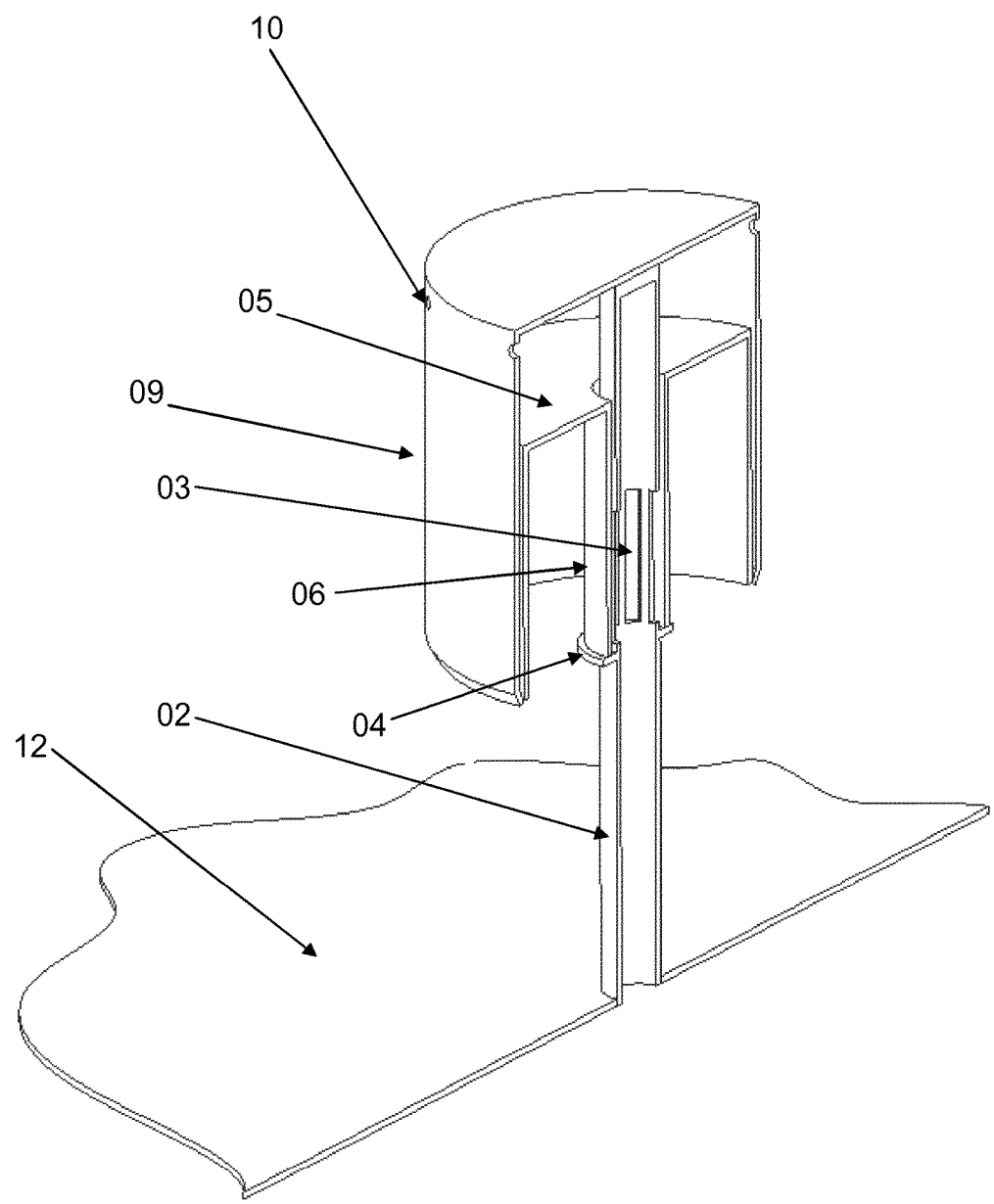
FIG. 9 shows a cut through view of the float valve assembly on the bottom plate of a tray.
Figure 10:
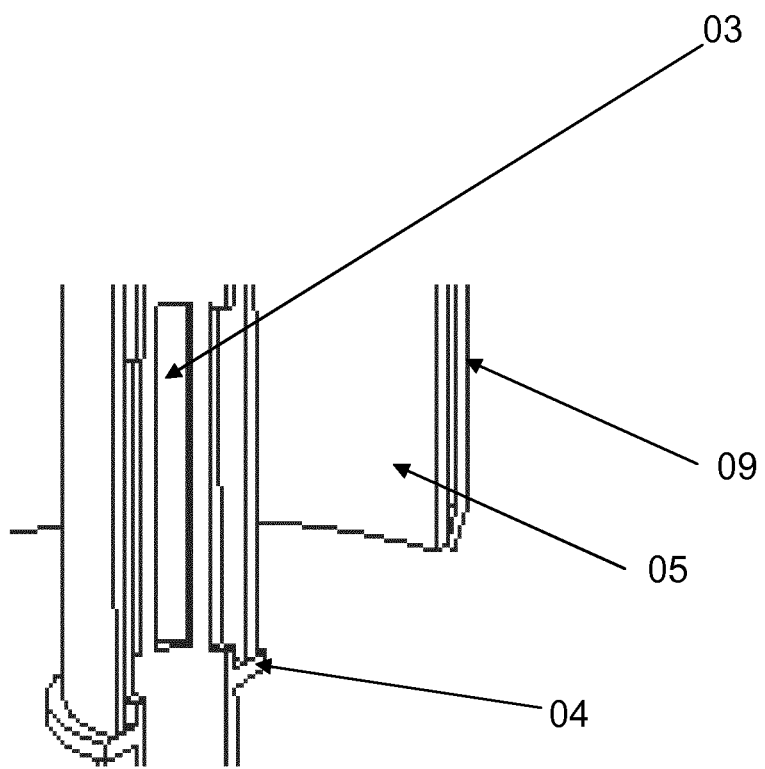
FIG. 10 shows a cut through detailed view of the float valve.
Figure 11:
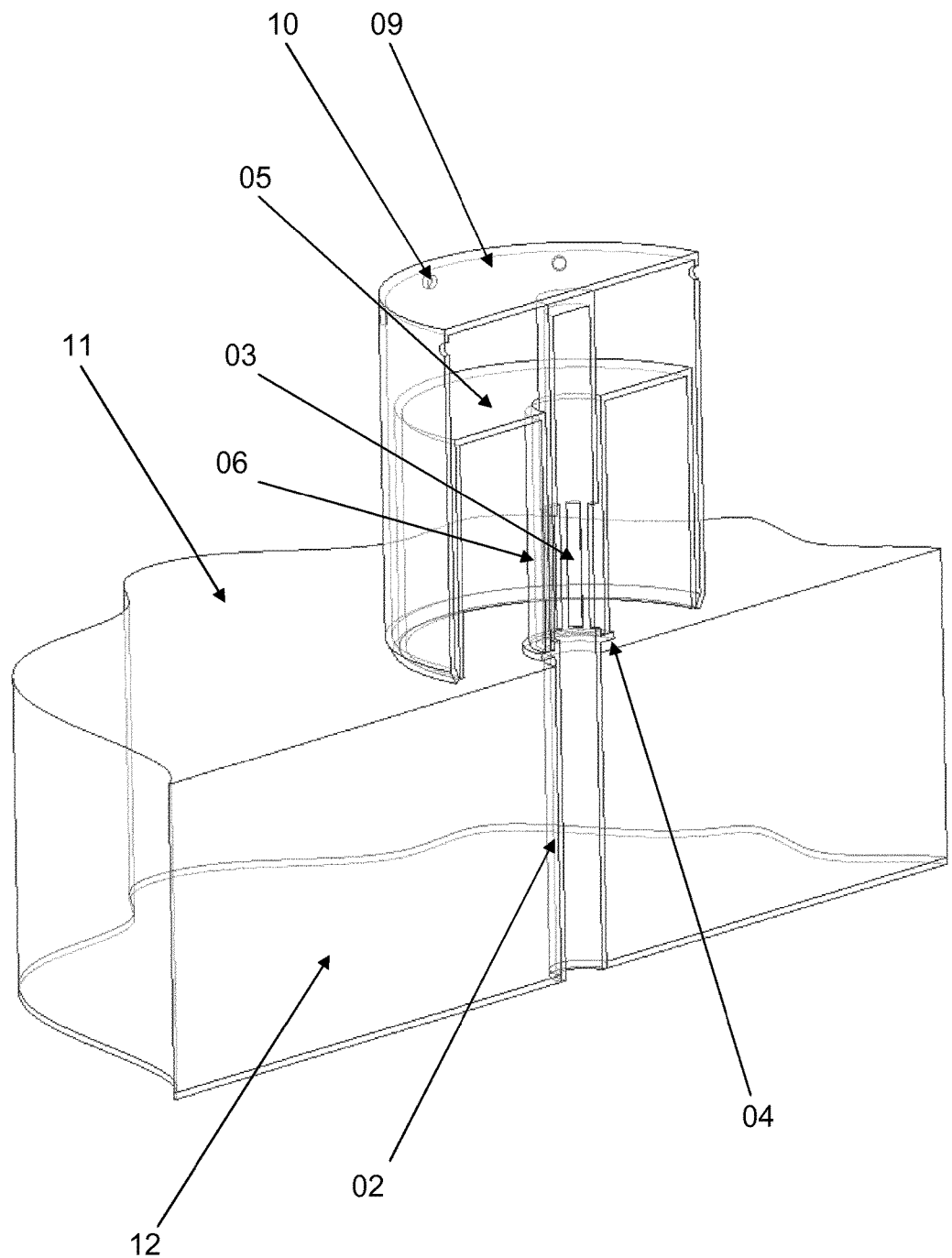
FIG. 11 shows a cut through view of the float valve assembly on the bottom plate of a tray with a liquid level.
Figure 12:
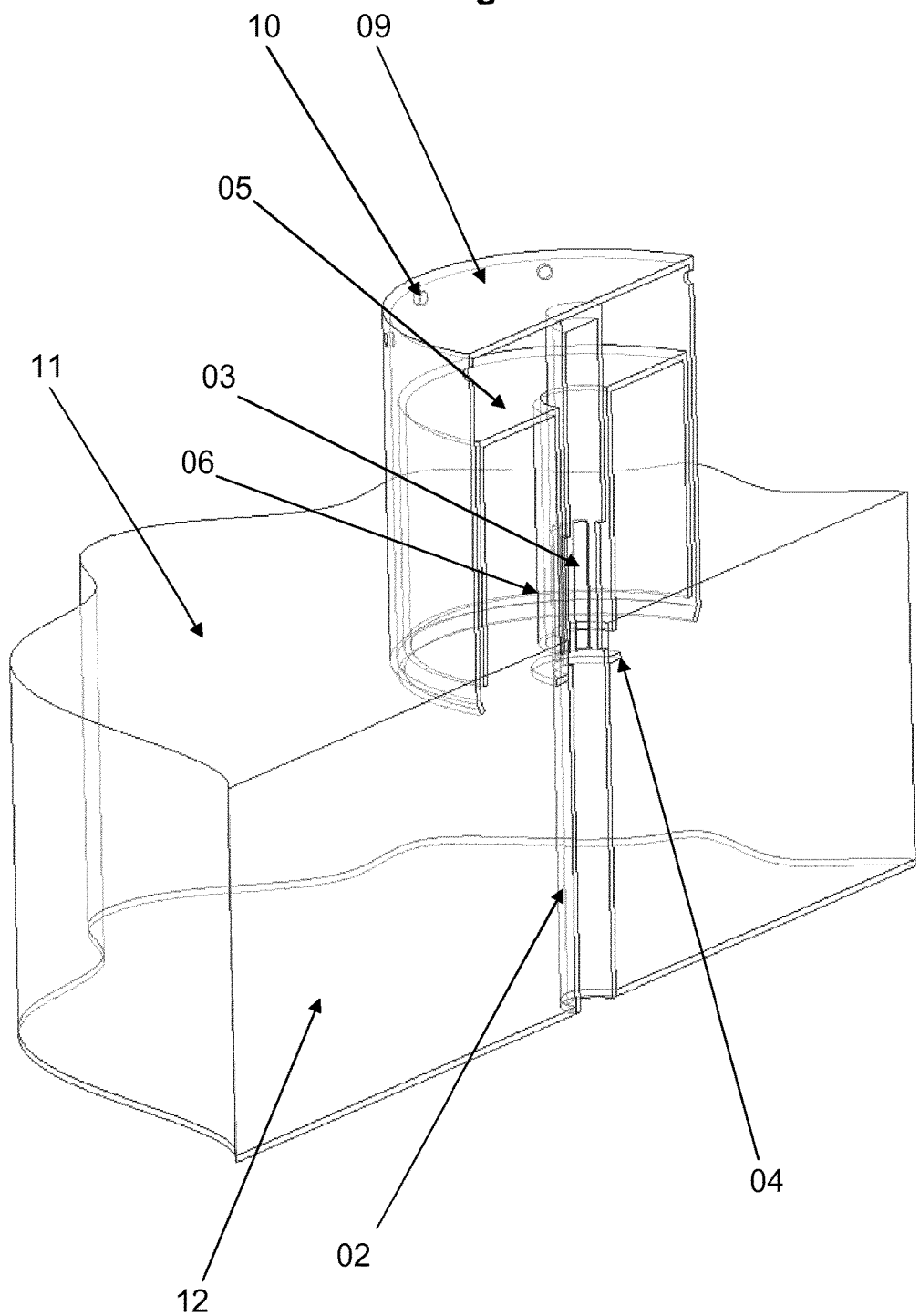
FIG. 12 shows a cut through view of the float valve assembly on the bottom plate of a tray with a liquid level rising the float.
Figure 13:
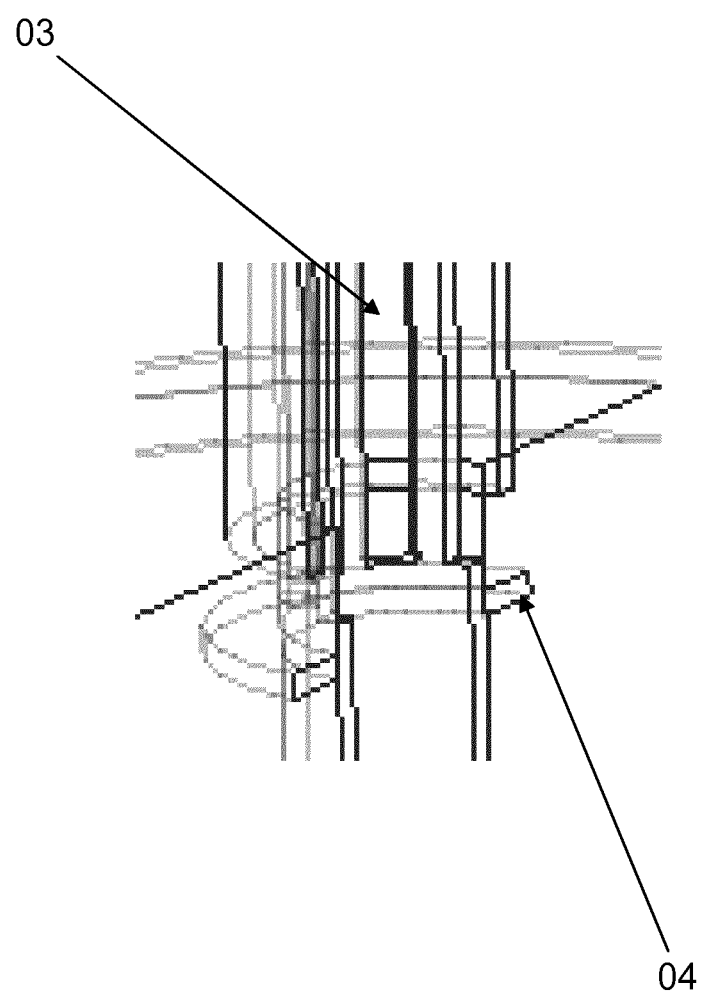
FIG. 13 shows a cut through detailed view of the float valve assembly with a liquid level raising the float.

The whole float valve assembly can be seen in cut view in FIG. 9. The guard head covers the float which is in its lower position in the absence of liquid. In this position the central pipe rests on the sealing ring and seals off the liquid transfer apertures so no liquid can pass into and down the liquid transfer pipe and further to the lower level below the tray bottom plate. The detail of the sealed off liquid transfer apertures can be seen in zoom view on FIG. 10. The same image is seen on FIG. 11, but in this case in the presence of a liquid level 11 which can be present in the tray without opening the float valve, since the liquid has not yet passed the buoyancy level of the float. However, in FIG. 12 and in zoom view in FIG. 13 the liquid level in the tray is now so high, that the float is lifted due to its buoyancy, because gas above the liquid stays trapped inside the body of the float. This makes the central pipe to lift from the sealing ring, enabling passage of the liquid in through the slots/liquid transfer apertures and down through the liquid transfer pipe.

Once when the temperature inside the reactor increases above the liquid end boiling point and only gas phase is delivered to the reactor, the liquid level will be decreased and the float valve will close. The remaining liquid in the tray will evaporate and be transferred through the tray as a gas through gas transfer tubes. Gas transfer through the float valve will not be possible as the valve will be closed when the central pipe rests on the sealing ring again.

The invention claimed is:
1. A float valve for a chemical reactor comprising:
   a liquid transfer pipe comprising at least one liquid transfer aperture;
   a sealing ring arranged on the transfer pipe below the at least one liquid transfer aperture;
   a float comprising a central pipe adapted to fit around said liquid transfer pipe in a free gliding engagement; and a guard head on top of the liquid transfer pipe with an open lower end and an inner diameter larger than the outer diameter of the float, for protecting the float valve against scales and impurities, the guard head comprising vent apertures at its upper part;

wherein the float has a volume to weight ratio large enough to enable it to float on a liquid and adapted to be in a sealing engagement with the sealing ring when the float is in a lower position relative to the liquid transfer pipe, the float is an enclosed volume on its upper end and its sides and has an opening at its lower end.

2. A float valve according to claim 1 wherein the float is cylinder shaped with a doughnut shaped upper plate a cylindrical side plate and wherein the outer periphery of the doughnut plate is connected to the upper edge of the cylindrical side plate and the inner periphery of the doughnut plate is connected to the upper end of the central pipe and wherein the float has no bottom plate.

3. A float valve according to claim 1, wherein the sealing engagement is between the lower edge of the central pipe and the sealing ring.

4. A float valve according to claim 1, wherein the at least one liquid transfer aperture is fowled as one or more slots.

5. A chemical reactor comprising at least one tray comprising at least one float valve, wherein said float valve comprises:
   a liquid transfer pipe comprising at least one liquid transfer aperture;
   a sealing ring arranged on the transfer pipe below the at least one liquid transfer aperture;
   a float comprising a central pipe adapted to fit around said liquid transfer pipe in a free gliding engagement;
wherein the float has a volume to weight ratio large enough to enable it to float on a liquid and adapted to be in a sealing engagement with the sealing ring when the float is in a lower position relative to the liquid transfer pipe, the float is an enclosed volume on its upper end and its sides and has an opening at its lower end.

6. A chemical reactor comprising at least one tray comprising at least one float valve according to claim 5, wherein the float is cylinder shaped with a doughnut shaped upper plate a cylindrical side plate and wherein the outer periphery of the doughnut plate is connected to the upper edge of the cylindrical side plate and the inner periphery of the doughnut plate is connected to the upper end of the central pipe and wherein the float has no bottom plate.

7. A chemical reactor comprising at least one tray comprising at least one float valve according to claim 5, wherein the sealing engagement is between the lower edge of the central pipe and the sealing ring.

8. A chemical reactor comprising at least one tray comprising at least one float valve according to claim 5, wherein the at least one liquid transfer aperture is formed as one or more slots.

9. A chemical reactor comprising at least one tray comprising at least one float valve according to claim 5, further comprising a guard head on top of the liquid transfer pipe with an open lower end and an inner diameter larger than the outer diameter of the float, for protecting the float valve against scales and impurities.

10. A chemical reactor comprising at least one tray comprising at least one float valve according to claim 9, wherein the guard head comprises vent apertures at its upper part.

11. A chemical reactor comprising at least one tray comprising at least one float valve according to claim 5, wherein said chemical reactor is a radial converter for carrying out catalytic reactions, catalytic reforming or ammonia synthesis, said radial converter has a radial flow crossing a packed bed of catalytic material and comprising deck elements, wherein said deck elements are fixed to the reactor.

12. A chemical reactor comprising at least one tray comprising at least one float valve according to claim 5, wherein said chemical reactor is a reactor is adapted to carry out the catalytic reactions, sulphur and nitrogen conversion (HDS/HDN); hydrogenation of: olefins (HYD) and aromatics (hydrodearomatisation—HDA), metals removal (hydride-metallisation—HDM), oxygen conversion (hydrodeoxygenation—HDO) or hydrocracking (HC).

* * * * *